United States Patent
Kim et al.

(10) Patent No.: US 10,042,104 B2
(45) Date of Patent: Aug. 7, 2018

(54) CURVED DISPLAY DEVICE

(71) Applicant: Samsung Display Co., Ltd., Yongin, Gyeonggi-Do (KR)

(72) Inventors: Donghwan Kim, Seongnam-si (KR); Young-Min Park, Hwaseong-si (KR); Hyuk-Hwan Kim, Hwaseong-si (KR); Seokhyun Nam, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 298 days.

(21) Appl. No.: 14/967,054

(22) Filed: Dec. 11, 2015

(65) Prior Publication Data
US 2016/0216432 A1    Jul. 28, 2016

(30) Foreign Application Priority Data
Jan. 23, 2015   (KR) .................. 10-2015-0011528

(51) Int. Cl.
*F21V 7/04*    (2006.01)
*F21V 8/00*    (2006.01)
(Continued)

(52) U.S. Cl.
CPC ......... *G02B 6/0035* (2013.01); *G02B 6/0045* (2013.01); *G02B 6/0068* (2013.01);
(Continued)

(58) Field of Classification Search
CPC .. G02B 6/0035; G02B 6/0045; G02B 6/0058; G02B 6/0011; G02B 6/0068;
(Continued)

(56) References Cited

U.S. PATENT DOCUMENTS 7,815,358 B2   10/2010   Inditsky
8,602,581 B1   12/2013   Kaihotsu
(Continued)

FOREIGN PATENT DOCUMENTS

JP    2008098190 A  *  4/2008
JP       4963592 B2     4/2012
(Continued)

OTHER PUBLICATIONS

Machine Translation of N, Nov. 24, 2017.*
(Continued)

*Primary Examiner* — Evan Dzierzynski
(74) *Attorney, Agent, or Firm* — H.C. Park & Associates, PLC

(57) ABSTRACT

A curved display device includes a display panel having a curved shape and including a display area having a curved surface and a backlight assembly providing a light to the display panel. The backlight assembly includes a plurality of light sources, a printed circuit board on which the light sources are mounted, and a light guiding plate. The light guiding plate has a curved shape and guides the light provided from the light sources to the display panel. The light sources are sequentially arranged along the curved direction of the light guiding plate, and a longitudinal direction of at least one of the light sources is different from a longitudinal direction of the other light sources.

29 Claims, 11 Drawing Sheets

(51) Int. Cl.
  *G02F 1/1333*   (2006.01)
  *G02F 1/1335*   (2006.01)
(52) U.S. Cl.
  CPC .. *G02F 1/133305* (2013.01); *G02F 1/133615* (2013.01); *G02B 6/0046* (2013.01)
(58) Field of Classification Search
  CPC ....... G09F 2013/0481; G02F 1/133615; G02F 1/133305
  USPC .................................. 362/606, 612, 613
  See application file for complete search history.

(56) References Cited

U.S. PATENT DOCUMENTS

| | | | | |
|---|---|---|---|---|
| 2007/0041215 A1* | 2/2007 | Kao | ............ | G02B 6/0036 362/620 |
| 2009/0086504 A1* | 4/2009 | Kim | ............ | G02B 6/005 362/612 |
| 2009/0196069 A1* | 8/2009 | Iwasaki | ............ | G02B 6/0041 362/613 |
| 2009/0303744 A1* | 12/2009 | Iwasaki | ............ | G02B 6/0041 362/612 |
| 2013/0207946 A1 | 8/2013 | Kim et al. | | |
| 2013/0329162 A1* | 12/2013 | Fujii | ............ | H05K 7/14 349/58 |
| 2014/0111974 A1 | 4/2014 | Choi et al. | | |
| 2014/0125913 A1* | 5/2014 | Lee | ............ | G02B 6/0093 349/58 |
| 2014/0307474 A1 | 10/2014 | Kim et al. | | |

FOREIGN PATENT DOCUMENTS

| | | |
|---|---|---|
| JP | 2013-222029 A | 10/2013 |
| KR | 10-2012-0082862 A | 7/2012 |

OTHER PUBLICATIONS

European Search Report issued by European Patent Office dated Mar. 7, 2016 in connection with European Patent Application No./Patent No. 16152062.2-1904, which also claims Korean Patent Application Serial No. 10-2015-0011528 as its priority document.

* cited by examiner

CURVED DISPLAY DEVICE

CLAIM OF PRIORITY

This U.S. non-provisional patent application claims the priority of and all the benefits accruing under 35 U.S.C. § 119 of Korean Patent Application No. 10-2015-0011528, filed on Jan. 23, 2015 in the Korean Intellectual Property Office (KIPO), the contents of which are hereby incorporated by reference in its entirety.

BACKGROUND OF THE INVENTION

1. Field of disclosure

The present disclosure relates to a curved display device. More particularly, the present disclosure relates to a curved display device having a curved display area.

2. Description of the Related Art

A flat panel display device is widely applied to various information-processing devices, such as a television set, a monitor, a notebook computer, a mobile phone, etc., to display an image. In recent years, a curved display device having a curved display area has been developed. The curved display device provides the image having improved three-dimensional effect, sense of immersion (or immersiveness), and presence to a viewer.

SUMMARY OF THE INVENTION

The present disclosure provides a curved display device having a slim structure and improved display quality.

Embodiments of the inventive concept provide a curved display device including a display panel having a curved shape and including a display area having a curved surface and a backlight assembly providing a light to the display panel.

The backlight assembly includes a plurality of light sources emitting the light, a printed circuit board on which the light sources are mounted, and a light guiding plate having a curved shape and guiding the light provided from the light sources to the display panel.

The light sources are sequentially arranged along a curved direction of the light guiding plate, and a long-side direction of at least one of the light sources is different from a long-side direction of the other light sources.

The light guiding plate includes a first section, a second section, and a third section, which are sequentially defined on the light guiding plate along the curved direction of the light guiding plate, the light sources are arranged along the first, second, and third sections, and the light sources are arranged in plural rows corresponding to the second section.

According to the above, the thickness of the edge part of the light guiding plate of the curved display device is smaller than the length of the long side of the light source, and thus the light guiding plate and the curved display device become slim.

In addition, although the edge part of the light guiding plate becomes slim, the amount of the light incident to the light guiding plate may be sufficiently secured. Thus, display quality of the curved display device may be prevented from being deteriorated.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1A:
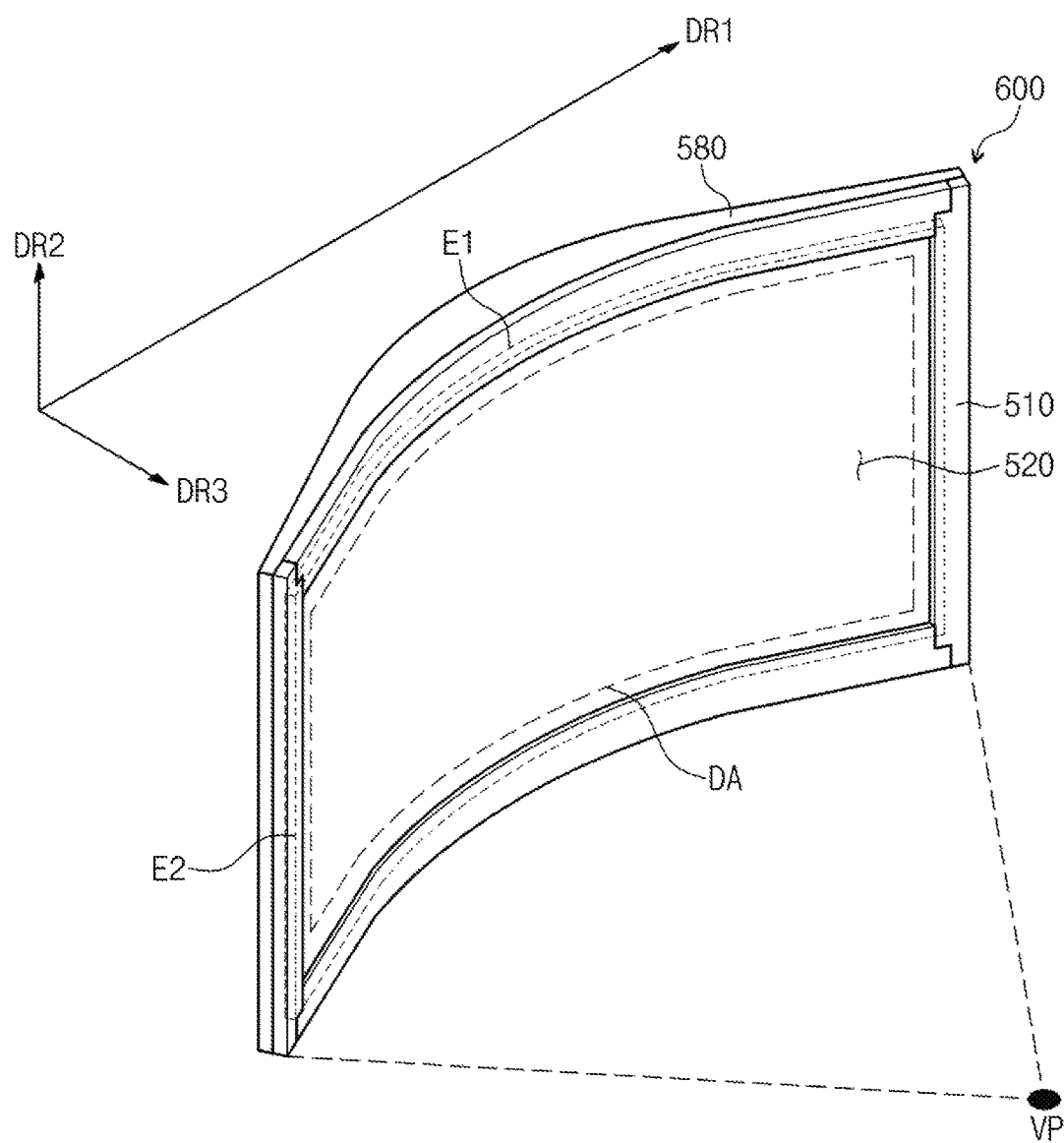
FIG. 1A is an oblique view showing a curved display device according to an exemplary embodiment of the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 1B:
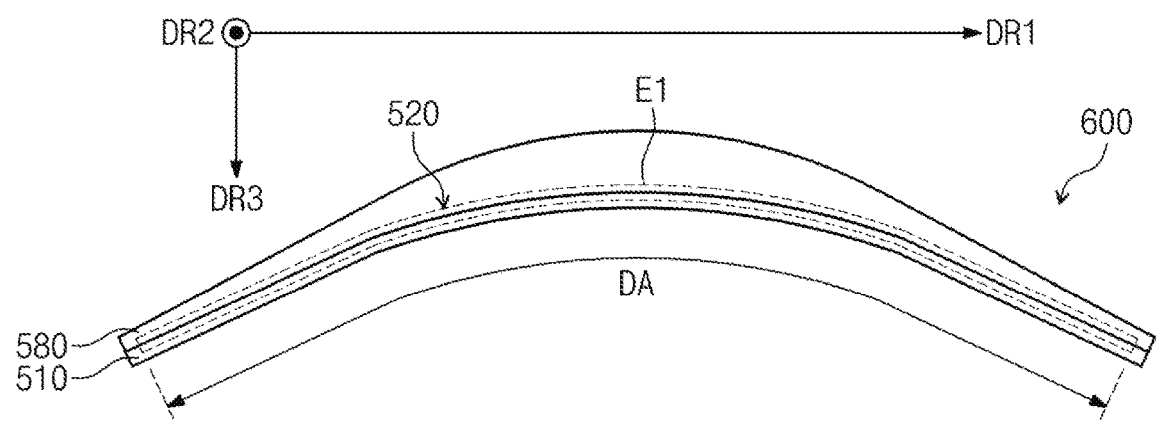
FIG. 1B is a top view showing the curved display device shown in FIG. 1A.

FIG. 1A is an oblique view showing a curved display device 600 according to an exemplary embodiment of the present disclosure, and FIG. 1B is a top view showing the curved display device shown in FIG. 1A.

Referring to FIGS. 1A and 1B, the curved display device 600 is bent along a first direction DR1 and provided with a display area DA having a curved shape. Thus, the curved display device 600 provides an image having improved three-dimensional effect, sense of immersion (or immersiveness), and presence to a viewer through the display area DA.

In the present exemplary embodiment, a viewpoint VP of the viewer is defined in front of the curved display device 600, and the display area DA has a concave-curved shape when viewed at the viewpoint VP. In another exemplary embodiment, the display area DA may have a convex-curved shape as viewed relative to the viewpoint VP.

The curved display device 600 includes an accommodating member 580, a display panel 520, a backlight assembly 500 (refer to FIG. 2), a supporting member 530, and a covering member 510.

In the present exemplary embodiment, the display panel 520 is a liquid crystal display panel, and the display panel 520 displays an image using a light generated by the backlight assembly. However, the display panel 520 should not be limited to the liquid crystal display panel. That is, the display panel 520 may be a nanocrystal display panel, an electrophoretic display panel, or an electrowetting display panel.

The display panel 520 is bent along the first direction DR1. Thus, long sides El of the display panel 520 extend in a curved line shape along the first direction DR1 and short sides E2 of the display panel 520 extend in a straight line shape along a second direction DR2 substantially perpendicular to the first direction DR1.

The accommodating member 580 accommodates the display panel 520 therein, and the covering member 510 is coupled to the accommodating member 580 in which the display panel 520 is accommodated. The covering member 510 has an opening formed therethrough to correspond to the display area DA and covers edges of the display panel 520. Thus, the display area DA is exposed to the outside of the curved display device 600.

Figure 2:
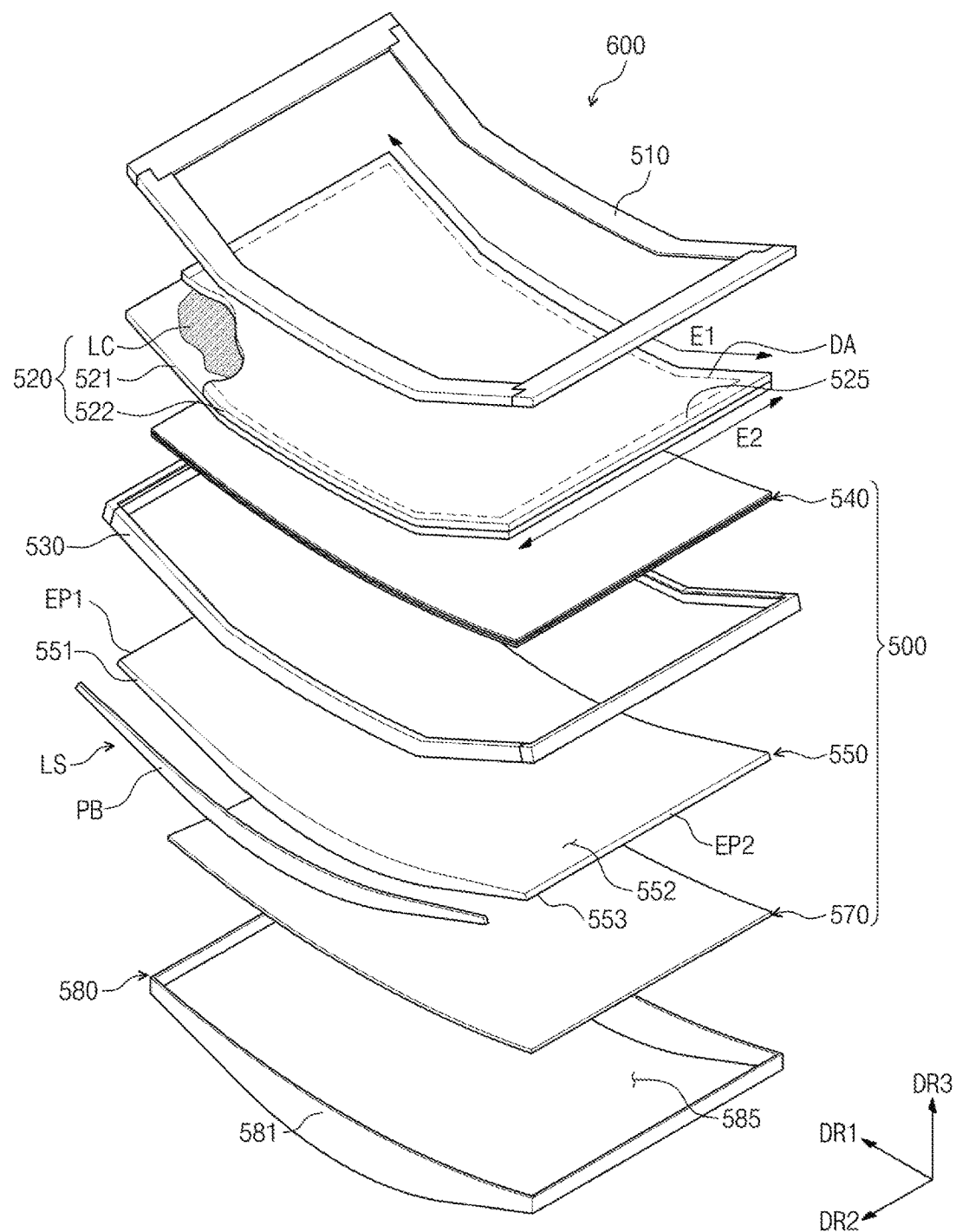
FIG. 2 is an exploded oblique view showing the curved display device shown in FIG. 1A.

FIG. 2 is an exploded oblique view showing the curved display device shown in FIG. 1A.

The display panel 520 includes a first substrate 521, a second substrate 522, and a liquid crystal layer LC interposed between the first substrate 521 and the second substrate 522.

The first substrate 521 includes a plurality of pixels, each including a pixel electrode (not shown) and a thin film transistor (not shown) switching a driving signal applied to the pixel electrode. The second substrate 522 includes a common electrode (not shown) and a color filter (not shown). The common electrode forms an electric field applied to the liquid crystal layer LC together with the pixel electrode, and the color filter filters the light generated from the backlight assembly 500 to a colored light.

The first and second substrates 521 and 522 have the above-described structure, however, the structure of the first and second substrates 521 and 522 should not limited thereto or thereby. For instance, instead of the second substrate 522, the first substrate 521 may include the color filter and the common electrode.

The backlight assembly 500 is accommodated in the accommodating member 580 and generates the light to the display panel 520. The backlight assembly 500 includes a printed circuit board PB, a plurality of light sources LS, a light guiding plate 550, a reflection plate 570, and a plurality of optical sheets 540.

The printed circuit board PB includes the light sources LS mounted thereon and applies a source voltage to the light sources LS. The light sources LS are arranged adjacent to a light incident surface 551 of the light guiding plate 550, and thus the light sources LS are arranged along the light incident surface 551 on the printed circuit board PB. Thus, the light emitted from the light sources LS is incident to the light guiding plate 550 through the light incident surface 551, and the light incident to the light guiding plate 550 is guided to the display panel 520.

In the present exemplary embodiment, each of the light sources LS may be, but not limited to, a light emitting diode (LED) package including a light emitting diode.

The reflection plate 570 is disposed on a bottom portion 585 of the accommodating member 580. The reflection plate 570 includes a light reflecting material, such as, polyethylene terephthalate (PET), aluminum, etc., and reflects the light emitted from the light sources LS to the light guiding plate 550.

The light guiding plate 550 is disposed between the reflection plate 570 and a plurality of optical sheets 540. The light guiding plate 550 guides the light emitted from the light sources LS to the display panel 520. More particularly, the light guiding plate 550 includes a light exit surface 552, and the light incident through the light incident surface 551 is provided to the display panel 520 through the light exit surface 552.

The light guiding plate 550 has a curved shape to correspond to the curved shape of the display panel 520. More particularly, the light guiding plate 550 is curved along the first direction DR1 and the light exit surface 552 of the light guiding plate 550 has a curved shape.

The light guiding plate 550 includes a rear surface 553 facing the light exit surface 552, and the rear surface 553 has a curved shape. In the present exemplary embodiment, a curvature radius of the light exit surface 552 is greater than that of the rear surface 553. Details on the structure of the light guiding plate 550 will be described with reference to FIG. 3.

The optical sheets 540 are disposed between the display panel 520 and the light guiding plate 550. In the present exemplary embodiment, the optical sheets 540 include a diffusion sheet and a prism sheet. The diffusion sheet diffuses the light incident to the optical sheets 540, and the prism sheet changes a path of the light obliquely incident to the optical sheets 540 to allow the light to travel to a front of the display panel 520.

The accommodating member 580 includes the bottom portion 585 and a plurality of sidewalls 581 extending from the bottom portion 585, and a containing space is defined in the accommodating member 580 to accommodate the backlight assembly 500. The bottom portion 585 of the accommodating member 580 has a curved shape bent along the first direction DR1 to correspond to the curved shape of the display panel 520, and a sidewall, which faces the light incident surface 551 of the light guiding plate 550 among the sidewalls 581, has a height variable depending on a shape of the light incident surface 551.

The supporting member 530 extends along an edge part 525 of the display panel 520 and is coupled to the sidewalls 581 of the accommodating member 580. In addition, the supporting member 530 is coupled to the display panel 520 to support the edge part 525 of the display panel 520.

The covering member 510 covers the edge part 525 of the display panel 520. Also, the covering member 510 is coupled to the supporting member 530 to support the edge part 525 of the display panel 520 in cooperation with the supporting member 530. Thus, the curved shape of the display panel 520 is maintained by the covering member 510 and the supporting member 530.

Figure 3A:
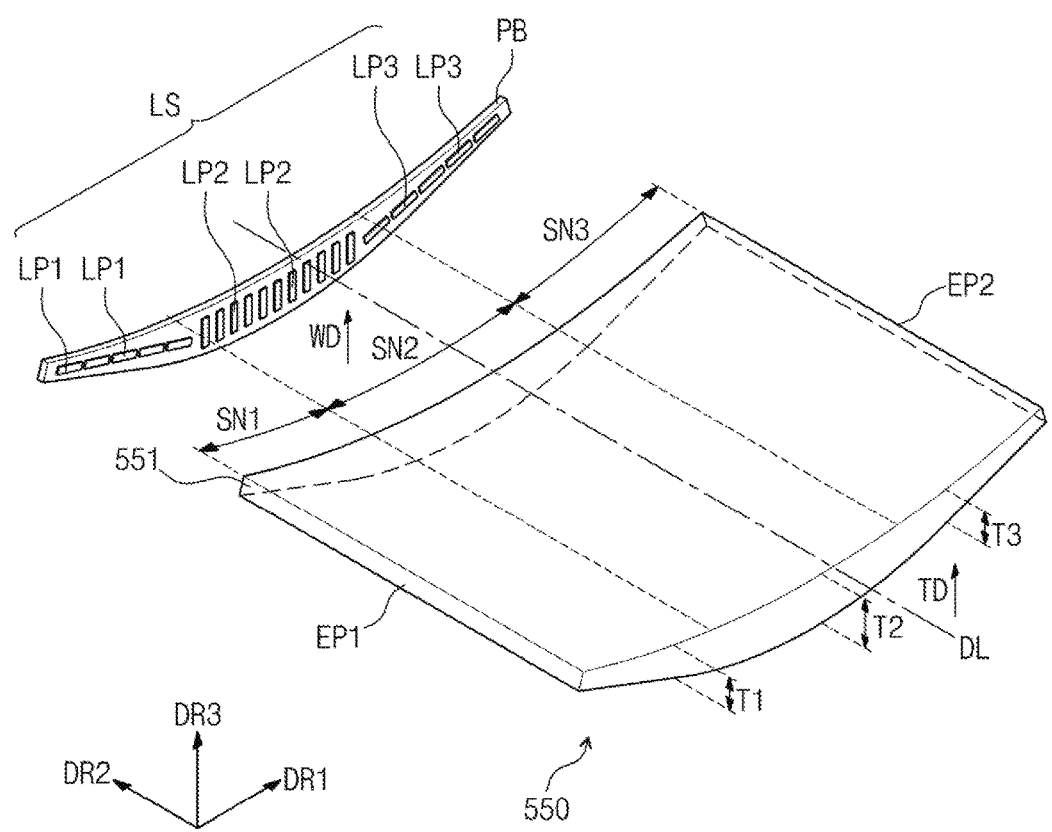
FIGS. 3A and 3B are oblique views each showing an arrangement relationship between a light guiding plate, a printed circuit board, and light sources shown in FIG. 2.
Figure 3B:
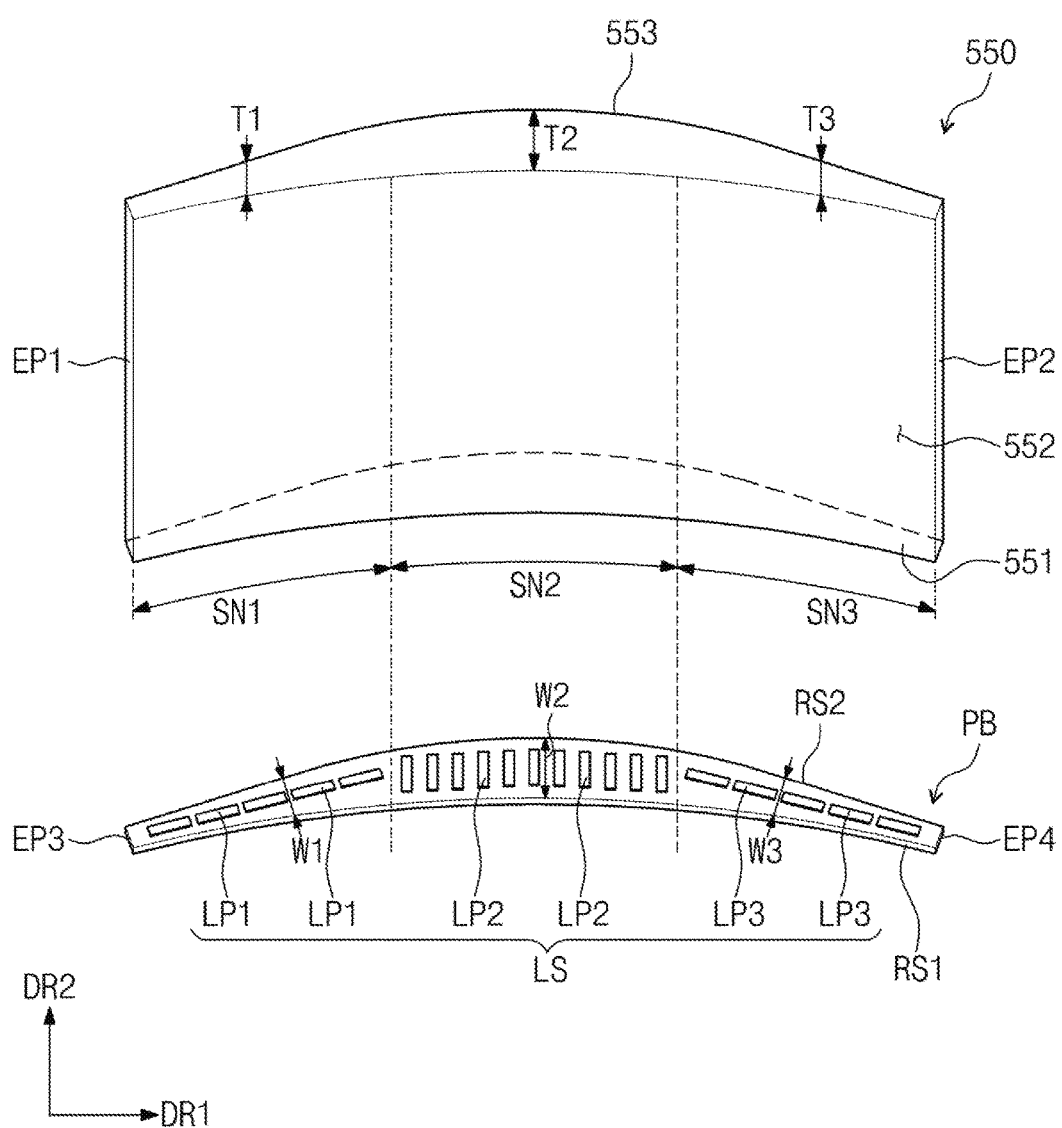

FIGS. 3A and 3B are oblique views each showing an arrangement relationship between the light guiding plate 550, the printed circuit board PB, and the light sources LS shown in FIG. 2.

Referring to FIGS. 3A and 3B, the light guiding plate 550 has the curved shape along the first direction DR1, and a first section SN1, a second section SN2, and a third section SN3 are sequentially defined along the curved direction of the light guiding plate 550.

The light guiding plate 550 has a first thickness T1, a second thickness T2, and a third thickness T3 in the first section SN1, the second section SN2, and the third section SN3, respectively. The first, second, and third thicknesses T1, T2, and T3 may be variable, and the first thickness T1 or the third thickness T3 is smaller than the second thickness T2.

The light guiding plate 550 includes a first edge EP1 and a second edge EP2 facing the first edge EP1 in the second direction DR2, and a reference line DL is defined substantially perpendicular to a thickness direction TD of the light guiding plate 550 to divide the second section SN2 into two areas. In this case, a thickness of the light guiding plate 550 increases as a distance from the reference line DL decreases. Also, the first thickness of T1 and the third thickness of T3 measured at a same distance from the thickness direction TD may have a same value; in other words, the light guiding plate 550 is symmetrical about the thickness direction TD.

The light guiding plate 550 has a shape symmetrical with respect to the reference line DL.

According to the structure of the light guiding plate 550 described above, each of the light exit surface 552 and the rear surface 553 facing the light exit surface 552 of the light guiding plate 550 has the curved shape, and the curvature radius of the light exit surface 552 is different from a curvature radius of the rear surface 553. In the present exemplary embodiment, the curvature radius of the light exit surface 552 is greater than that of the rear surface 553.

The printed circuit board PB has a shape corresponding to a shape of the light incident surface 551. More particularly, the printed circuit board PB extends along the first, second, and third sections SN1, SN2, and SN3 and has a first width W1, a second width W2, and a third width W3 in a one-to-one correspondence relationship with the first, second, and third sections SN1, SN2, and SN3. The first width W1 or the third width W3 is smaller than the second width W2.

The printed circuit board PB includes a third edge EP3 and a fourth edge EP4 facing the third edge EP3, and a width of the printed circuit board PB increases as a distance from the reference line DL decreases.

The printed circuit board PB includes a first rounded side RS1 and a second rounded side RS2, which connect the third edge EP3 and the fourth edge EP4, and a curvature radius of the first rounded side RS1 is greater than a curvature radius of the second rounded side RS2.

The light sources LS are disposed on the printed circuit board PB and arranged along the first, second, and third sections SN1, SN2, and SN3.

Each of the light sources LS has the same size and shape as to each other. In more detail, each of the light sources LS has substantially a rectangular shape having long sides and short sides when viewed in a plan view. For instance, each of the long sides is about 4 millimeters and each of the short sides is about 1.4 millimeters.

The light sources LS include first light sources LP1 arranged corresponding to the first section SN1, second light sources LP2 arranged corresponding to the second section SN2, and third light sources LP3 arranged corresponding to the third section SN3.

In the present exemplary embodiment, a direction, to which the long sides are arranged, in a portion of the light sources LS is different from a direction, to which the long sides are arranged, in the other portion of the light sources LS. In more detail, the direction, to which the long sides of the second light sources LP2 are arranged, is different from the direction to which the long sides of the first and third light sources LP1 and LP3 are arranged. Details on the above will be described with reference to FIGS. 4A to 4C.

Figure 4A:
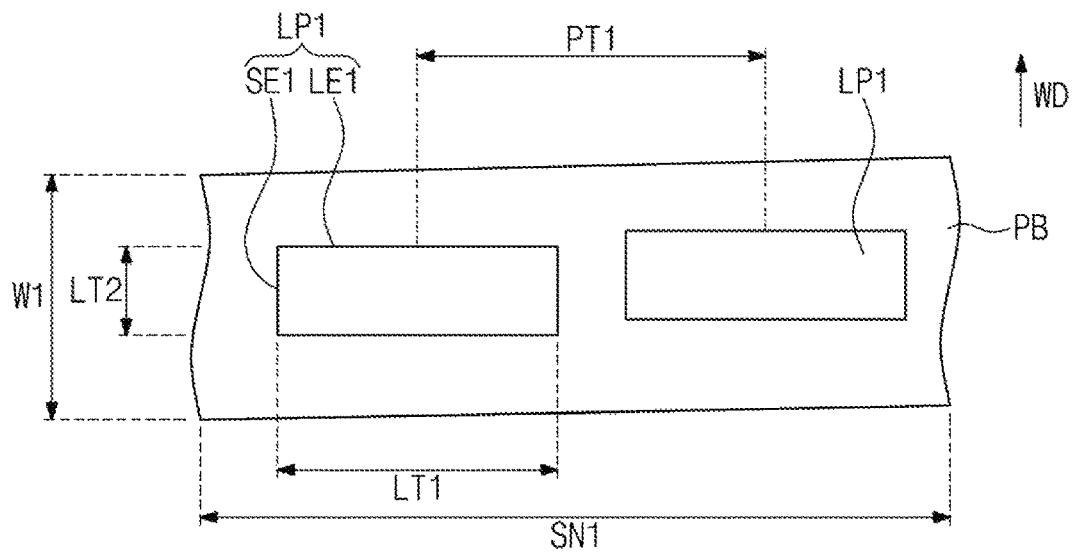
FIG. 4A is an enlarged view showing first light sources shown in FIG. 3A.
Figure 4B:
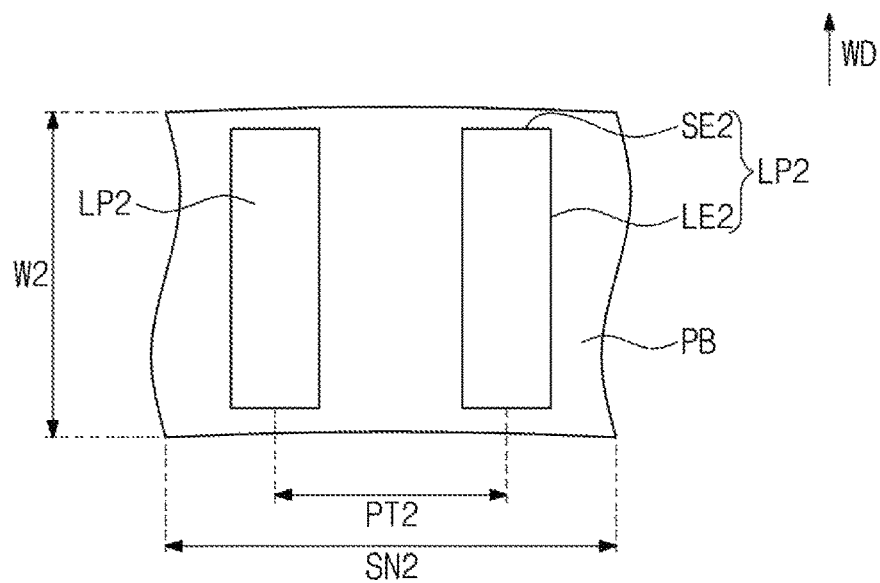
FIG. 4B is an enlarged view showing second light sources shown in FIG. 3A.
Figure 4C:
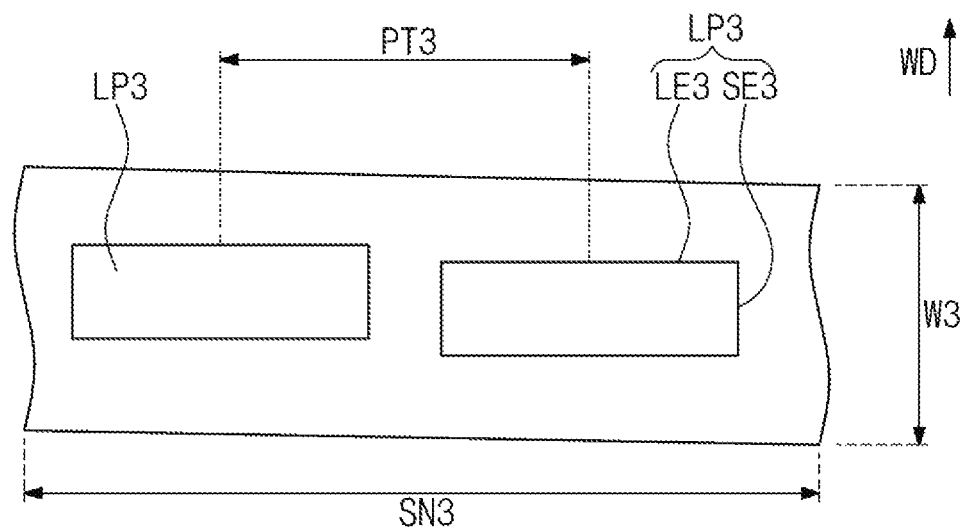
FIG. 4C is an enlarged view showing third light sources shown in FIG. 3A.

FIG. 4A is an enlarged view showing the first light sources LP1 shown in FIG. 3A, FIG. 4B is an enlarged view showing the second light sources LP2 shown in FIG. 3A, and FIG. 4C is an enlarged view showing the third light sources LP3 shown in FIG. 3A.

Referring to FIGS. 3A, 3B, and 4A, the first light sources LP1 are arranged with a first pitch PT1 on the printed circuit board PB to correspond to the first section SN1. Each of the first light sources LP1 has a first long side LE1 and a first short side SE1.

In the present exemplary embodiment, since the printed circuit board PB has the shape corresponding to the light incident surface 551 of the light guiding plate 550, a width direction WD of the printed circuit board PB is substantially parallel to the thickness direction TD of the light guiding plate 550.

The first long side LE1 crosses each of the width direction WD and the thickness direction TD. In detail, the first long side LE1 is arranged substantially perpendicular to each of the width direction WD and the thickness direction TD. In addition, the first short side SE1 is arranged substantially parallel to the width direction WD and the thickness direction TD.

When the printed circuit board PB has the first width W1 corresponding to the first section SN1, the first long side LE1 has a first length LT1, and the first short side SE1 has a second length LT2, the first width W1 is smaller than the first length LT1 and greater than the second length LT2.

In addition, when the light guiding plate 550 has the first thickness T1 corresponding to the first section SN1, the first thickness T1 is smaller than the first length LT1 and greater than the second length LT2.

Referring to FIGS. 3A, 3B, and 4B, the second light sources LP2 are arranged with a second pitch PT2 on the printed circuit board PB to correspond to the second section SN2. In the present exemplary embodiment, a length of the second pitch PT2 is smaller than a length of the first pitch PT1 (refer to FIG. 4A).

Each of the second light sources LP2 has a second long side LE2 and a second short side SE2. In the present exemplary embodiment, since the size of each of the second light sources LP2 is substantially the same as the size of each of the first light sources LP1 (refer to FIG. 4A), the second long side LE2 has substantially the same length as the first long side LE1 (refer to FIG. 4A) and the second short side SE2 has substantially the same length as the first short side SE1 (refer to FIG. 4A).

The second light sources LP2 are arranged in a different manner from the first light sources LP1 (refer to FIG. 4A). More particularly, the second long side LE2 is substantially parallel to each of the width direction WD of the printed circuit board PB and the thickness direction TD of the light guiding plate 550, and the second short side SE2 crosses the width direction WD and the thickness direction TD. For instance, the second short side SE2 is arranged substantially perpendicular to each of the width direction WD and the thickness direction TD.

When the printed circuit board PB has the second width W2 and the light guiding plate 550 has the second thickness T2 corresponding to the second section SN2, the second width W2 is greater than the second long side LE2 or the second short side SE2, and the second thickness T2 is greater than the second long side LE2 or the second short side SE2.

Referring to FIGS. 3A, 3B, and 4C, the third light sources LP3 are arranged with a third pitch PT3 on the printed circuit board PB to correspond to the third section SN3. Each of the third light sources LP3 has a third long side LE3 and a third short side SE3.

In the present exemplary embodiment, the third pitch PT3 is greater than the second pitch PT2 (refer to FIG. 4B), and the third pitch PT3 is substantially the same as the first pitch PT1 (refer to FIG. 4A).

The third light sources LP3 are arranged in a different manner from the second light sources LP2 (refer to FIG. 4B) and arranged in a similar manner as the first light sources LP1 (refer to FIG. 4A). More particularly, the third long side LE3 crosses each of the width direction WD of the printed circuit board PB and the thickness direction TD of the light guiding plate 550. For instance, the third long side LE3 is arranged substantially perpendicular to the width direction WD and the thickness direction TD. Also, the third short side SE3 is arranged substantially parallel to the width direction WD and the thickness direction TD.

When the printed circuit board PB has the third width W3 and the light guiding plate 550 has the third thickness T3 corresponding to the third section SN3, the third width W3 or the third thickness T3 is smaller than the third long side LE3 and greater than the third short side SE3.

When the first, second, and third light sources LP1, LP2, and LP3 are arranged in the first, second, and third sections SN1, SN2, and SN3, respectively, as the above described manner, the following first and second effects may be expected.

According to the first effect, even though the thickness of the light guiding plate 550 becomes smaller than the length of the long side of the light sources LS in the first and third sections SN1 and SN3, the light sources LS are easily arranged to correspond to the first and third sections SN1 and SN3. In other words, when the size of each of the light sources LS is defined, the light guiding plate 550 is realized in a slim structure to allow the thickness of the first and second edges EP1 and EP2 of the light guiding plate 550 to be smaller than the length of the long side of the light sources LS.

According to the second effect, the light sources LS are more densely arranged in the second section SN2 than in the first or third sections SN1 or SN3, and thus an amount of light incident to the light guiding plate 550 is easily increased. For instance, in a case that the second pitch PT2 corresponds to a half of the first pitch PT1, the amount of light incident to the light guiding plate 550 in the second section SN2 increases by about 100%.

Also, when a rate of the second section SN2 in the first, second, and third sections SN1, SN2, and SN3 is controlled, a total amount of light incident to the light guiding plate 550 is easily adjusted. For instance, when the rate of the second section SN2 in the first, second, and third sections SN1, SN2, and SN3 is about 50%, the total amount of light incident to the light guiding plate 550 increases by about 50%. Thus, the total amount of light incident to the light guiding plate 550 is easily optimized by controlling the rate of the second section SN2 in the first, second, and third sections SN1, SN2, and SN3.

Figure 5:
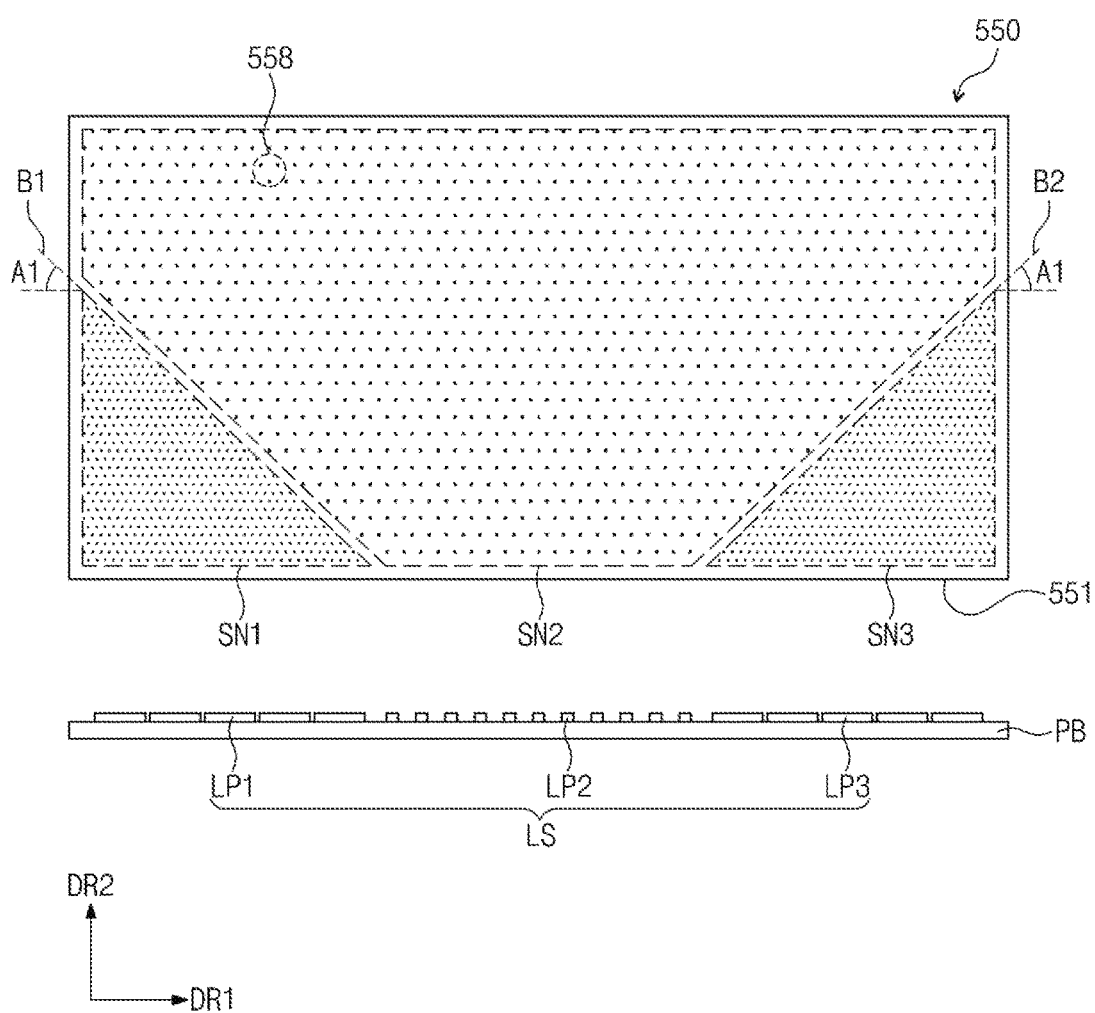
FIG. 5 is a front elevation view showing the light guiding plate and the light sources shown in FIGS. 3A and 3B.

FIG. 5 is a front elevation view showing the light guiding plate 550 and the light sources LS shown in FIGS. 3A and 3B.

Referring to FIG. 5, the first section SN1, the second section SN2, and the third section SN3 are defined in the light guiding plate 550 when viewed in a front elevation view. In addition, a first boundary B1 is defined between the first section SN1 and the second section SN2 and a second boundary B2 is defined between the second section SN2 and the third section SN3.

Each of the first boundary B1 and the second boundary B2 is inclined with respect to the light incident surface 551 of the light guiding plate 550 when viewed in a front elevation view. More particularly, a first angle A1 is defined between each of the first and second boundaries B1 and B2 and the light incident surface 551 of the light guiding plate 550, and the first angle A1 is within a range from about 30 degrees to about 70 degrees.

The light guiding plate 550 includes a light guiding pattern 558, and the light guiding pattern 558 is disposed on the rear surface 553 (refer to FIG. 3B). In the present exemplary embodiment, the light guiding pattern 558 includes a semi-transmissive material such as oxide titanium (TiO2), and in another exemplary embodiment, the light guiding pattern 558 may be a concave-convex pattern defined at the rear surface.

A density of the light guiding pattern 558 disposed in the first and third sections SN1 and SN3 is greater than a density of the light guiding pattern 558 disposed in the second section SN2. Thus, even though the light sources LS are more densely arranged in the second section SN2 to allow the amount of light incident to the second section SN2 to be greater than the amount of light incident to the first and second sections SN1 and SN3, the amount of light exiting to the outside of the light guiding plate 550 through the entirety of the light exit surface 552 (refer to FIG. 3B) of the light guiding plate 550 becomes uniform by adjusting the density of the light guiding pattern 558.

According to another exemplary embodiment, a brightness of each of the first and third light sources LP1 and LP3 is higher than a brightness of each of the second light sources LP2. Therefore, an amount of light in the second section SN2, which may be relatively smaller than in the first and third sections SN1 and SN3, is compensated by densely arranging the second light sources LP2 having relatively low brightness. As a result, the light sources having a relatively low brightness are effectively utilized.

Figure 6:
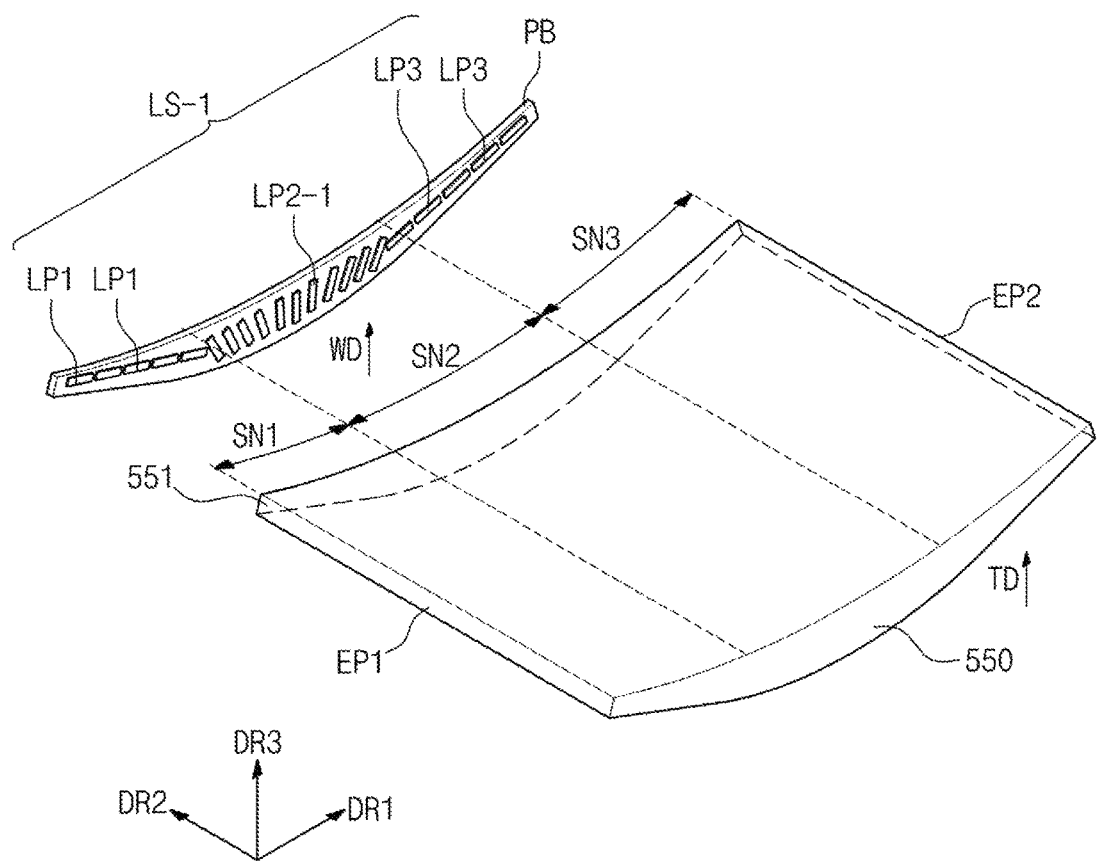
FIG. 6 is an oblique view showing an arrangement relationship between a light guiding plate, a printed circuit board, and a plurality of light sources according to another exemplary embodiment of the present disclosure.
Figure 7:
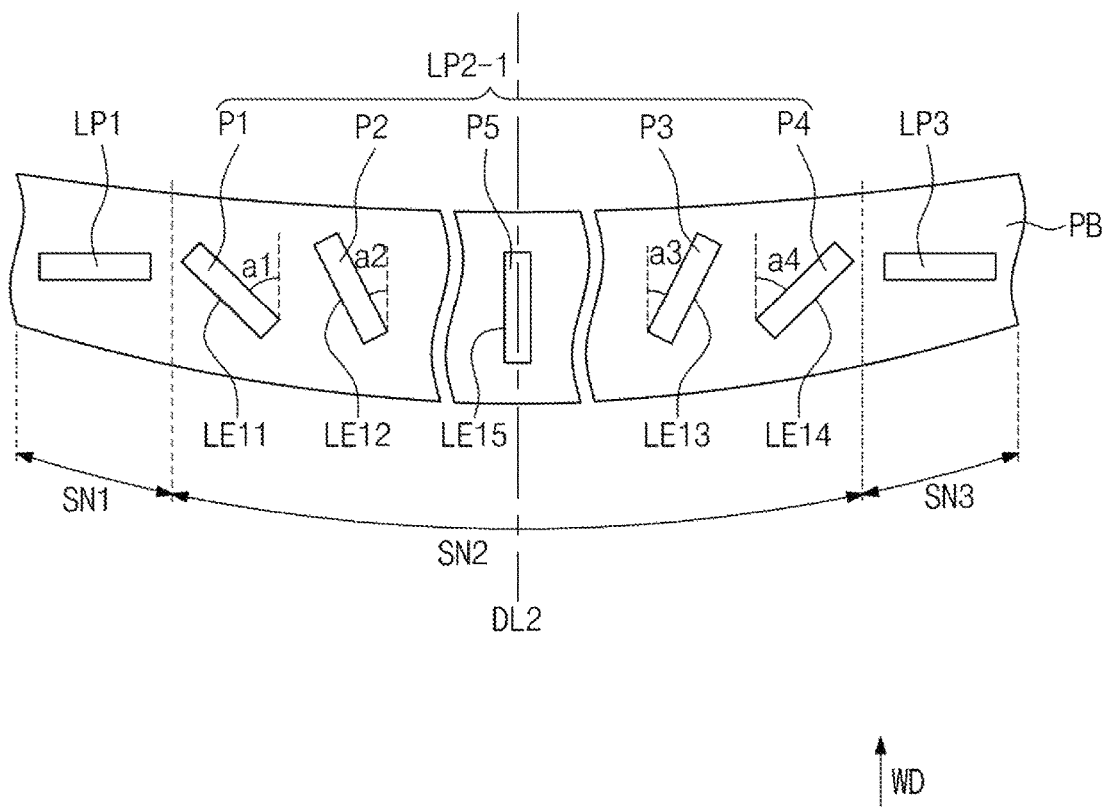
FIG. 7 is an enlarged view showing a portion of the light sources shown in FIG. 6.

FIG. 6 is an oblique view showing an arrangement relationship between a light guiding plate, a printed circuit board, and a plurality of light sources according to another exemplary embodiment of the present disclosure, and FIG. 7 is an enlarged view showing a portion of the light sources shown in FIG. 6. In FIGS. 6 and 7, the same reference numerals denote the same elements in previous embodiments, and thus the detailed descriptions of the same elements will be omitted.

Referring to FIGS. 6 and 7, a plurality of light sources LS-1 is arranged along a first section SN1, a second section SN2, and a third section SN3 of a light guiding plate 550. The light sources LS-1 include first light sources LP1, second light sources LP2-1, and third light sources LP3.

In the present exemplary embodiment, a longitudinal direction of a portion of the second light sources LP2-1 is substantially parallel to each of a thickness direction TD of the light guiding plate 550 and a width direction WD of a printed circuit board PB, and a longitudinal direction of the other portion of the second light sources LP2-1 is substantially parallel to a diagonal direction of the thickness direction TD and the width direction WD.

In more detail, the second light sources LP2-1 include a first light emitting diode (LED) package P1 having a first long side LE11, a second LED package P2 having a second long side LE12, a third LED package P3 having a third long side LE13, a fourth LED package P4 having a fourth long side LE14, and a fifth LED package P5 having a fifth long side LE15. The fifth long side LE15 is substantially parallel to the width direction WD, and each of the first to fourth long sides LE11 to LE14 is substantially parallel to a diagonal direction to the width direction WD.

Also, an inclination angle is formed between each of the first to fourth long sides LE11 to LE14 and the width direction WD or the thickness direction TD, and a reference line DL2 is defined substantially parallel to the width direction WD or the thickness direction TD to divide the second section SN2 into two areas. In this case, the inclination angle becomes greater as a distance from the reference line DL2 increases in the second section SN2. For instance, a first angle a1, a second angle a2, a third angle a3, and a fourth angle a4 are defined between the width direction WD and the first to fourth long sides LE11 to LE14, the first angle a1 is greater than the second angle a2, and the fourth angle a4 is greater than the third angle a3.

In the present exemplary embodiment, since the light sources LS-1 are more densely arranged in the second section SN2 than in the first or third sections SN1 or SN3, an amount of light incident to the light guiding plate 550 is easily increased. In addition, a rate of the second section SN2 in the first, second, and third sections SN1, SN2, and SN3 is controlled to allow the total amount of light incident to the light guiding plate 550 to be easily adjusted.

Figure 8:
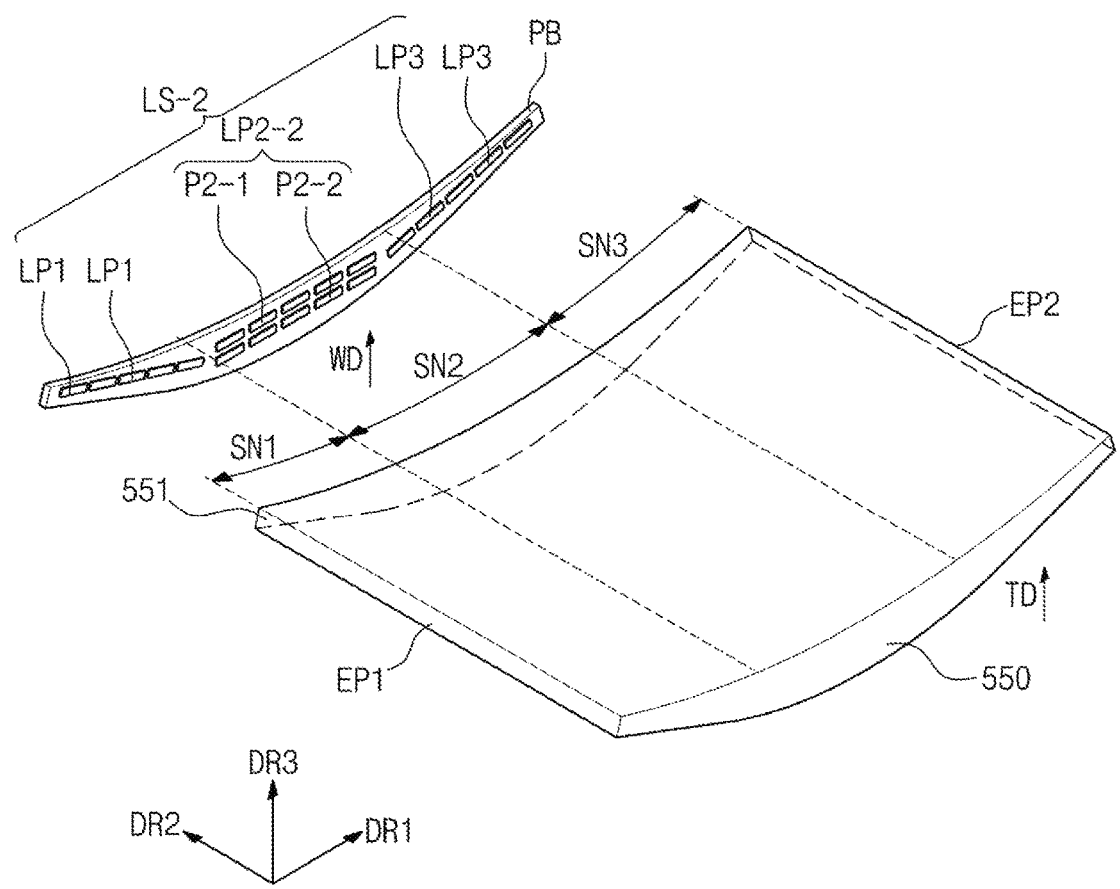
FIG. 8 is an oblique view showing an arrangement relationship between a light guiding plate, a printed circuit board, and a plurality of light sources according to another exemplary embodiment of the present disclosure.

FIG. 8 is an oblique view showing an arrangement relationship between a light guiding plate, a printed circuit board, and a plurality of light sources according to another exemplary embodiment of the present disclosure. In FIG. 8, the same reference numerals denote the same elements in previous embodiments, and thus the detailed descriptions of the same elements will be omitted.

Referring to FIG. 8, a plurality of light sources LS-2 is arranged along a first section SN1, a second section SN2, and a third section SN3 of a light guiding plate 550, and the light sources LS-2 include first light sources LP1, second light sources LP2-2, and third light sources LP3. The first light sources LP1 are arranged on the printed circuit board PB corresponding to the first section SN1, the second light sources LP2-2 are arranged on the printed circuit board PB corresponding to the second section SN2, and the third light sources LP3 are arranged on the printed circuit board PB corresponding to the third section SN3.

In the present exemplary embodiment, the second light sources LP2-2 are arranged in plural rows on the printed circuit board PB, and the number of rows of the second light sources LP2-2 arranged on the printed circuit board PB is greater than the number of rows of the first light sources LP1 or the number of rows of the third light sources LP3 arranged on the printed circuit board PB.

More particularly, the second light sources LP2-2 include first LED packages P2-1 arranged in one row and second LED packages P2-2 arranged in the other row. Thus, the first light sources LP1 are arranged in one row to correspond to the first section SN1, the third light source LP3 are arranged in one row to correspond to the third section SN3, and the second light sources LP2-2 are arranged in two rows to correspond to the second section SN2.

In the present exemplary embodiment, since the light sources LS-2 are more densely arranged in the second section SN2 than in the first or third sections SN1 or SN3, an amount of light incident to the light guiding plate 550 is easily increased. In addition, a total amount of light incident to the light guiding plate 550 is easily adjusted by controlling a rate of the second section SN2 in the first, second, and third sections SN1, SN2, and SN3.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:
1. A curved display device comprising:
  a display panel having a curved shape and comprising a display area having a curved surface; and
  a backlight assembly providing a light to the display panel, the backlight assembly comprising:
  a plurality of light sources emitting the light;
  a printed circuit board on which the light sources are mounted; and
  a light guiding plate having a curved shape and guiding the light provided from the light sources to the display panel,
  wherein the light guiding plate comprises a light exit surface and a rear surface facing the light exit surface, each of the light exit surface and the rear surface has a curved surface shape, and a curvature radius of the light exit surface is greater than a curvature radius of the rear surface, wherein the light sources are sequentially arranged along a curved direction of the light guiding plate, and a long-side direction of at least one of the light sources is different from a long-side direction of the other light sources.

2. The curved display device of claim 1, wherein the light guiding plate comprises a first section, a second section, and a third section, the first, second, and third sections are sequentially defined on the light guiding plate along the curved direction of the light guiding plate, and a long-side direction of the light sources disposed corresponding to the first section and the third section is different from a long-side direction of the light sources disposed corresponding to the second section.

3. The curved display device of claim 2, wherein a thickness of the light guiding plate corresponding to each of the first and third sections is smaller than a thickness of the light guiding plate corresponding to the second section.

4. The curved display device of claim 3, wherein each of the display panel and the light guiding plate has the curved shape along a first direction, a first reference line is defined substantially parallel to a second direction, the first reference line is substantially perpendicular to the first direction, to divide the light guiding plate into two areas, and a thickness of the light guiding plate increases as a distance from the first reference line in the second direction decreases.

5. The curved display device of claim 4, wherein the light guiding plate has a symmetrical shape with respect to the first reference line.

6. The curved display device of claim 3, wherein the light guiding plate has a first thickness in the first and third sections, the light guiding plate has a second thickness in the second section, a long-side length of each of the light sources is greater than the first thickness, the long-side length of each of the light sources is smaller than the second thickness, and a short-side length of each of the light sources is smaller than the first thickness.

7. The curved display device of claim 2, wherein the light sources comprise first light sources arranged on the printed circuit board to correspond to the first section, and each of the first light sources having a first long side;

second light sources arranged on the printed circuit board to correspond to the second section, and each of the second light sources having a second long side; and third light sources arranged on the printed circuit board to correspond to the third section, and each of the third light sources having a third long side, wherein the second long side is arranged substantially parallel to a thickness direction of the light guiding plate, and each of a first long-side direction and a third long-side direction crosses a second long-side direction.

8. The curved display device of claim 7, wherein the first light sources are arranged with a first pitch, the second light sources are arranged with a second pitch, the third light sources are arranged with a third pitch, and each of the first pitch and the third pitch is greater than the second pitch.

9. The curved display device of claim 7, wherein each of the second light sources has a brightness lower than a brightness of each of the first light sources and the third light sources.

10. The curved display device of claim 7, wherein the light guiding plate comprises a light guiding pattern to allow the light provided from the light sources to exit to an outside of the light guiding plate, and a density of the light guiding pattern each in the first and third sections is greater than a density of the light guiding pattern in the second section.

11. The curved display device of claim 10, wherein a boundary between the first section and the second section and a boundary between the second section and the third section are inclined with respect to a light incident surface of the light guiding plate when viewed in a front elevation view.

12. The curved display device of claim 7, wherein each of the first long-side direction and the third long-side direction is substantially perpendicular to the second long-side direction.

13. The curved display device of claim 7, wherein the long-side direction of at least one of the first and third light sources is substantially perpendicular to the second long-side direction, and the long-side direction of the other of the first and third light sources is substantially parallel to a diagonal direction of the second long-side direction.

14. The curved display device of claim 13, wherein a second reference line is defined substantially parallel to the thickness direction to divide the second section into two areas, an inclination angle is defined between the long-side direction of each of the second light sources and the thickness direction, and a size of the inclination angle increases as a distance from the second reference line increases in the second section.

15. The curved display device of claim 2, wherein the printed circuit board extends along the first, second, and third sections of the light guiding plate, and a first width of the printed circuit board corresponding to each of the first and third sections is smaller than a second width of the printed circuit board corresponding to the second section.

16. The curved display device of claim 15, wherein each of the light sources comprises a long side and a short side, the long side has a length greater than the first width and smaller than the second width, and the short side has a length smaller than the first width.

17. The curved display device of claim 16, wherein each of the display panel and the light guiding plate comprises the curved shape along a first direction, a first reference line is defined substantially parallel to a second direction, the first reference line is substantially perpendicular to the first direction, to divide the printed circuit board into two areas, and the printed circuit board has a width that increases as a distance from the first reference line decreases.

18. The curved display device of claim 17, wherein the printed circuit board comprises two rounded edges curved along the first direction, and the two rounded edges have different curvature radii from each other.

19. The curved display device of claim 1, wherein at least one of the light sources has an orientation different from the other light sources.

20. The curved display device in claim 1, wherein the light guiding plate has sections of different thicknesses and different densities of a light guiding pattern.

21. A curved display device comprising:
a display panel having a curved shape and comprising a display area having a curved surface; and
a backlight assembly providing a light to the display panel, the backlight assembly comprising:
a plurality of light sources emitting the light;
a printed circuit board on which the light sources are mounted; and
a light guiding plate having a curved shape and guiding the light provided from the light sources to the display panel,
the light guiding plate comprising
a first section,
a second section, and
a third section,
wherein the first, second, and third sections are sequentially defined on the light guiding plate along the curved direction of the light guiding plate,
the light sources are arranged along the first, second, and third sections, and the light sources are arranged in plural rows corresponding to the second section, and the plural rows arranged in a direction perpendicular to the curved direction.

22. The curved display device of claim 21, wherein the light guiding plate has a first thickness in each of the first and third sections,
the first thickness is smaller than a second thickness of the light guiding plate in the second section.

23. The curved display device of claim 22, wherein each of the light sources comprises a long side and a short side,
the first thickness is greater than a short-side length,
the first thickness is smaller than a long-side length, and
the second thickness is greater than the long-side length.

24. The curved display device of claim 23, wherein each of the display panel and the light guiding plate has the curved shape along a first direction,
a first reference line is defined substantially parallel to a second direction,
the first reference line is substantially perpendicular to the first direction, and
the light guiding plate has a thickness that increases as a distance from the first reference line decreases.

25. The curved display device of claim 24, wherein the light guiding plate comprising a light exit surface and a rear surface facing the light exit surface,
each of the light exit surface and the rear surface having a curved surface shape, and
the light exit surface having a curvature radius greater than the rear surface.

26. The curved display device of claim 22, wherein the light sources comprise:
first light sources arranged to correspond to the first section;
second light sources arranged to correspond to the second section; and
third light sources arranged to correspond to the third section,
the number of rows in which the second light sources are arranged is greater than the number of rows in which the first light sources or the third light sources are arranged.

27. The curved display device of claim 22, wherein the printed circuit board extends along the first, second, and third sections, and
a first width of the printed circuit board corresponding to each of the first and third sections is smaller than a second width of the printed circuit board corresponding to the second section.

28. The curved display device of claim 27, wherein each of the display panel and the light guiding plate has the curved shape along a first direction,
a first reference line is defined substantially parallel to a second direction,
the first reference line is substantially perpendicular to the first direction, and
the light guiding plate has a thickness that increases as a distance from the first reference line decreases.

29. The curved display device of claim 28, wherein the printed circuit board comprises two rounded edges curved along the first direction, and the two rounded edges have different curvature radii from each other.

* * * * *